UNITED STATES PATENT OFFICE.

MAX DEINLEIN, OF MUNICH, GERMANY, ASSIGNOR TO THE FIRM OF TRAUTMANN & MAYER, OF MUNICH, GERMANY.

PROCESS FOR REGENERATING STORAGE-BATTERY PLATES.

1,034,887. Specification of Letters Patent. Patented Aug. 6, 1912.

No Drawing. Application filed October 25, 1911. Serial No. 656,735.

*To all whom it may concern:*

Be it known that I, MAX DEINLEIN, a subject of the German Emperor, and residing at Munich, Germany, have invented certain new and useful Improvements in Processes for Regenerating Storage-Battery Plates, of which the following is a specification.

The present invention has reference to a new and improved process for regenerating the negative plates of secondary batteries.

The potential difference of the plates of storage batteries, as is well known, diminishes after a relatively short period and often very suddenly, and the capacity of the battery drops correspondingly. Though in such instances the charge of the negative plates diminishes much quicker than that of the positive plates, or may already have been much lower at the start, the consumer, nevertheless, must still deal with the original total weight of the elements, so that, in case of portable elements, he must carry about a relatively large weight to obtain but a comparatively small voltage output.

I now have found that on diminution of the capacity of the negative plates, while the capacity of the positive plates is still high, the latter can be fully utilized by connecting (short-circuiting) the negative plates with zinc, preferably in the shape of amalgamated zinc or suitable zinc-alloy plates or rods, within the electrolyte. By this means the negative plates are regenerated in an astonishingly short time, and can then coöperate again with the positive plates, even when still electrically connected to the zinc member or members. This phenomenon is due to the fact that the zinc acts for the discharged or sulfated plates as soluble electrode. That zinc is about 0.4 volt more negative than lead, was known, but it was not obvious that it could be possible to make use of it for the purpose of regenerating already spent and even heavily sulfated negative plates, and this in an extraordinarily short period at that.

By this procedure it is now possible to run electromobiles with exhausted negative plates considerably longer by simply introducing alongside of these plates for a relatively short period amalgamated zinc members and short-circuiting them with the negative plates, and this may be done even during operation of the motor.

This procedure is equally advantageous for accumulators for lighting automobiles, balloons and other air-ships, boats, for pocket lamps, lamps for house use for illuminating residences, business premises, staircases, for igniting explosive engines, for telegraph and telephone stations, for galvanoplastic works, and the like.

The procedure is especially suitable for diminishing sulfating of the negative plates in the case of batteries which are used irregularly and stand idle for longer periods between times of operation.

When the batteries finally, after exhaustion of the positive plates, are re-charged, the zinc is to be removed from the electrolyte, as it should also be always when not in use for regenerating the negative plates. A moderate admixture of zinc to the electrolyte in no way interferes with the efficiency of the latter. In case of strong concentration the electrolyte must be renewed.

What I claim is:—

The process for regenerating the exhausted negative plates of storage batteries, which consists in introducing a zinc member into the electrolyte and then shortcircuiting the negative plates with this zinc member.

In testimony whereof I affix my signature in presence of two witnesses.

MAX DEINLEIN.

Witnesses:
ARTHUR V. W. CORK,
RICHARD LENYS.